(12) United States Patent
Iida

(10) Patent No.: US 6,442,109 B1
(45) Date of Patent: Aug. 27, 2002

(54) MOTOR CONTROL APPARATUS, MOTOR CONTROL METHOD, DISK APPARATUS AND DISK ACCESS METHOD FOR CORRECTING AN ASSUMED VALUE BASED ON ERROR INFORMATION

(75) Inventor: Michihiko Iida, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/829,974

(22) Filed: Apr. 2, 1997

(30) Foreign Application Priority Data

May 4, 1996 (JP) ............................................. 8-084160

(51) Int. Cl.[7] ................................................ G11B 7/00
(52) U.S. Cl. ................................ 369/30.14; 369/30.16; 369/44.28
(58) Field of Search ................................ 369/32, 44.32, 369/44.28, 44.27, 44.29, 54

(56) References Cited

U.S. PATENT DOCUMENTS

| | | | | |
|---|---|---|---|---|
| 4,884,259 A | * | 11/1989 | Horikawa et al. | 369/44.28 |
| 5,048,001 A | * | 9/1991 | Moriya et al. | 369/44.28 |
| 5,416,758 A | * | 5/1995 | Ito | 369/44.28 |
| 5,442,604 A | * | 8/1995 | Osada | 369/44.28 |
| 5,548,569 A | * | 8/1996 | Shimizume et al. | 369/44.28 |
| 5,592,448 A | * | 1/1997 | Suzuki et al. | 369/44.28 |
| 5,675,560 A | * | 10/1997 | Ogino | 369/44.28 |
| 5,675,562 A | * | 10/1997 | Yanagi | 369/44.28 |
| 5,689,482 A | * | 11/1997 | Iida | 369/44.28 |

FOREIGN PATENT DOCUMENTS

| | | |
|---|---|---|
| EP | 0 743 636 A | 11/1996 |
| JP | 60 047274 | 3/1985 |
| JP | 01 298525 | 12/1989 |
| JP | 2-45364 | 10/1990 |
| JP | 07 210882 | 8/1995 |
| JP | 09 120548 | 5/1997 |

* cited by examiner

Primary Examiner—Nabil Hindi
(74) Attorney, Agent, or Firm—Oblon, Spivak, McClelland, Maier & Neustadt, P.C.

(57) ABSTRACT

Even if an assumed value of a track pitch and an actual value thereof are different from each other, an optical pickup (2) can be positioned at a target position at high speed, which can realize higher-speed access. A drive-means control apparatus according to the present invention includes a target position calculating means (58) for calculating a target track number based on a head logic address of a track to be accessed, a current position calculating means (60) for calculating a current track number based on a current address, a number-of-tracks calculating means (61) for, based on the target track number and the current track number, calculating the number of tracks by which the optical pickup (2) is to be moved, a step number calculating means (62) for calculating a step number based on the number of tracks, the track pitch (assumed value) and so on, and an assumed value correcting means (65) for correcting the track pitch (assumed value) based on the calculated step number and the number of remaining tracks.

12 Claims, 9 Drawing Sheets

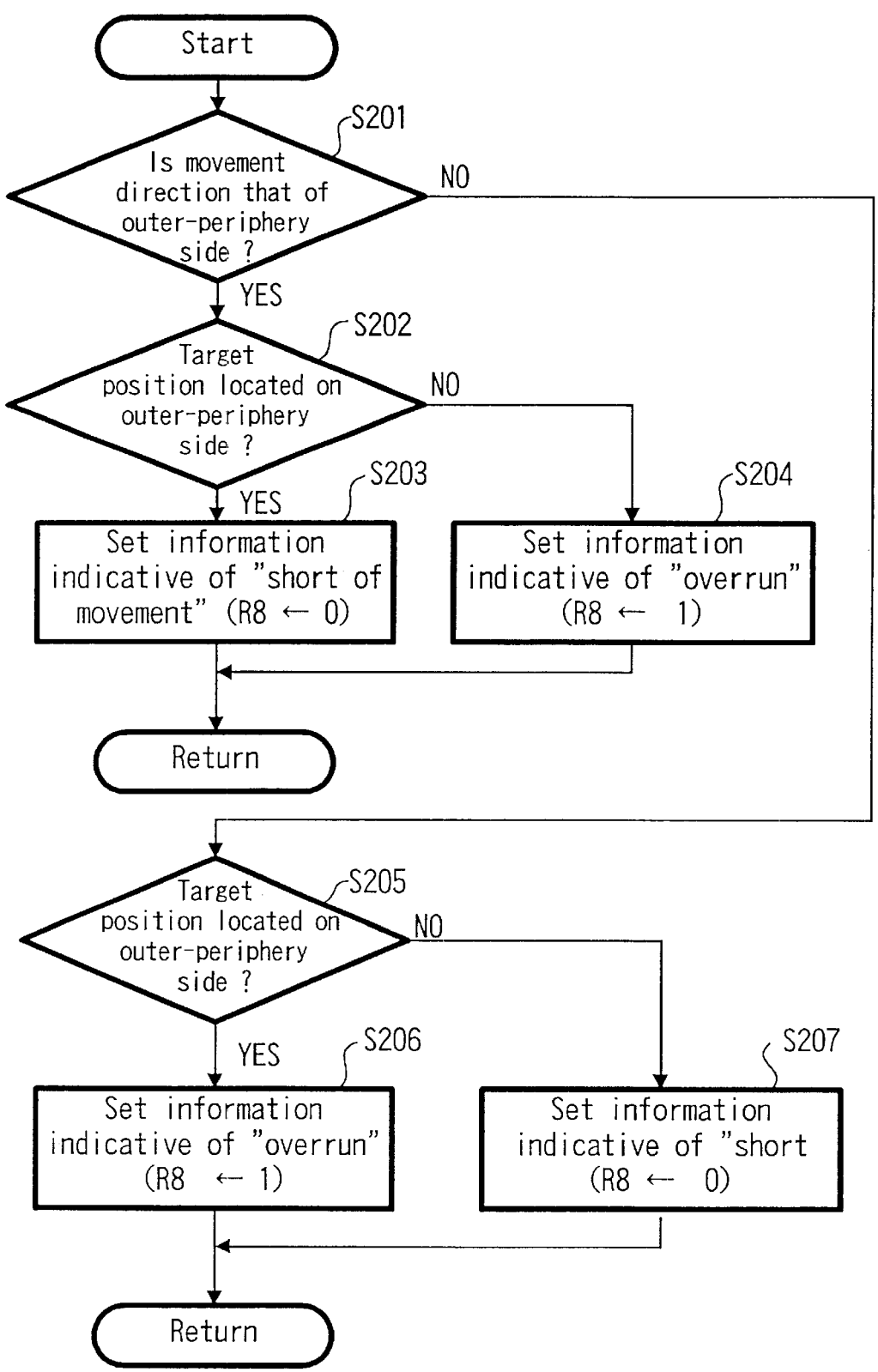

MOTOR CONTROL APPARATUS, MOTOR CONTROL METHOD, DISK APPARATUS AND DISK ACCESS METHOD FOR CORRECTING AN ASSUMED VALUE BASED ON ERROR INFORMATION

BACKGROUND OF THE INVENTION

1. Field of the Invention

The present invention relates to a motor control apparatus for positioning an object moved by rotation of a motor at a predetermined position, a motor control method thereof, a disk apparatus incorporating the above motor control apparatus, and a disk access method.

2. Description of the Related Art

A motor is generally used as a drive source for moving an object. Such motor includes a voice coil motor (hereinafter simply referred to as a VCM), a DC motor and the like. When the object moved by these motors is positioned at a predetermined position, a feedback control system is generally employed.

In the feedback control system, an input reference movement amount is compared with an object movement amount resulting from the rotation of the motor and a phase compensation means for stabilizing the control system phase-compensates a deviation which is a compared result to supply the phase-compensated deviation to a motor, thereby the object being moved at a higher speed as a distance indicated by the reference movement amount is long. The phase compensation means includes a means for carrying out only an I operation (proportional operation), a means for carrying out a PI operation (integration+proportional operation) or the like.

One of electronic equipments each incorporating a control mechanism for positioning an object at a predetermined position as described above is an optical disk apparatus mounted with an optical pickup for optically accessing an information signal recorded on an optical disk such as a CD-ROM, a magneto-optical disk or the like, for example.

A large number of the above optical disk apparatus employing the VCM, for example, as a drive source for moving the above optical pickup to a predetermined position (track) of the optical disk have been proposed and put into practice.

One of important factors for improving a performance of a disk apparatus is an increase of a speed of an operation for moving the optical pickup to a predetermined position, i.e., a seek operation. In order to carry out the seek operation at a higher speed, various attempts have been made and consequently a drive mechanism employing a linear motor or a stepping motor with a position sensor has been mainly used to achieve the high-speed seek operation.

When the moving mechanism employing the stepping motor is used to roughly move the optical pickup to a desired position, a target number of tracks is converted into a distance (movement step number) and the mechanism moves the optical pickup based on the conversion result. The movement step number is calculated based on a distance by which the optical pickup must be moved, a track pitch and a feed screw pitch. This calculation is carried out on the assumption that the track pitch and the screw pitch respectively have their predetermined values (e.g., center values of standard ranges).

When a magneto-optical disk having a diameter of 64 mm, for example, is used as an optical disk, its track pitch is $1.6 \pm 0.1$ $\mu$m. Even if the above movement step number is calculated on the assumption that the track pitch is 1.6 $\mu$m, the actual track pitch may be different from the assumed value by 0.1 $\mu$m.

Since the above magneto-optical disk has about 9600 tracks at maximum, if the assumed track pitch is different from the actual track pitch by 0.1 $\mu$m, then, when the movement distance is calculated from the number of tracks obtained based on the above assumed value, the difference between the distance by which the optical pickup must be moved and the calculated movement distance reaches about 960 $\mu$m. Since the difference therebetween of 960 $\mu$m corresponds to a difference therebetween of about 600 tracks, it takes a considerable time to position the optical pickup to a target track by using the stepping motor, which delays an access operation.

This disadvantage is also involved by the feed screw pitch, similarly. Since there is the difference between an assumed value of the feed screw pitch and the actual feed screw pitch, the difference leads to the delay in the operation of positioning the optical pickup.

SUMMARY OF THE INVENTION

In view of such aspects, it is an object of the present invention to provide a motor control apparatus and a motor control method which, even if an assumed value of a physical attribute and an actual value thereof are different from each other, can position an object to be moved at a target position at high speed.

It is another object of the present invention to provide a disk apparatus and a disk access method which, even if an assumed value of a track pitch and an actual value thereof are different from each other, can position an head at a target position at high speed and to access data recorded on a disk at higher speed.

According to a first aspect of the present invention, a drive-means control apparatus includes a movement-amount calculating means for calculating a movement amount obtained when an object to be moved is moved relative to an object to a target position on the object on the basis of an assumed value set in consideration of a physical attribute of the object, a drive means for moving the object to be moved based on the movement amount obtained by the movement-amount calculating means, a guide means for guiding the object to be moved in a direction toward the target position, an error detecting means for detecting an error between the assumed value and an actual value of the physical attribute based on a position which the object to be moved has reached after its movement and on the target position to output an error information, and an assumed value correcting means for correcting the assumed value based on the error information.

According to a second aspect of the present invention, a drive means control method includes a movement-amount calculating step of calculating a movement amount obtained when an object to be moved is moved relative to an object to a certain target position on the object on the basis of an assumed value set in consideration of a physical attribute of the object, a drive step of moving the object to be moved based on the movement amount obtained in the movement-amount calculating step, a guide step of guiding the object to be moved in a direction toward the target position, an error detecting step of detecting an error between the assumed value and an actual value of the physical attribute based on a position which the object to be moved has reached after its movement and on the target position to output an error information, and an assumed value correcting step of correcting the assumed value based on the error information.

According to a third aspect of the present invention, a disk apparatus for accessing a disk with its head includes a rotating means for rotating a disk loaded thereonto, a head guided in the radius direction of the disk for accessing an information data on the disk, a head-movement-amount calculating means for calculating a movement amount obtained when a head is moved to a target position on the disk on the basis of an assumed value set in consideration of a physical attribute of the disk, a head moving means for moving the head based on the movement amount obtained by the head-movement-amount calculating means, a guide means for guiding the head in a direction toward the target position, an error detecting means for detecting an error between the assumed value and an actual value of the physical attribute based on a position which the head has reached after its movement and on the target position to output an error information, and an assumed value correcting means for correcting the assumed value based on the error information.

According to a fourth aspect of the present invention, a disk access method of accessing a disk with a head includes a rotating step of rotating a disk loaded thereonto, a head-movement-amount calculating step of calculating a movement amount obtained when a head is moved to a target position on said disk on the basis of an assumed value set in consideration of a physical attribute of said disk, a guide step of guiding said head in a direction toward said target position, a head moving step of moving said head based on the movement amount obtained in said head-movement-amount calculating step, an error detecting step of detecting an error between said assumed value and an actual value of said physical attribute based on a position which said head has reached after its movement and on said target position to output an error information, and an assumed value-correcting step of correcting said assumed value based on said error information.

BRIEF DESCRIPTION OF THE DRAWINGS

FIG. 10 is a flowchart used to explain a processing of the overrun discriminating means.

DESCRIPTION OF THE PREFERRED EMBODIMENT

There will be described with reference to FIGS. 1 to 10 an embodiment in which a motor control apparatus according to the present invention is applied to a sled servo system of an optical pickup mounted in an optical disk apparatus designed for a magneto-optical disk, for example, as a disk (hereinafter simply referred to as a motor control apparatus according to an embodiment) and the above optical disk apparatus mounted with the motor control apparatus according to the embodiment (hereinafter simply referred to as an optical disk apparatus according to an embodiment).

Figure 1:
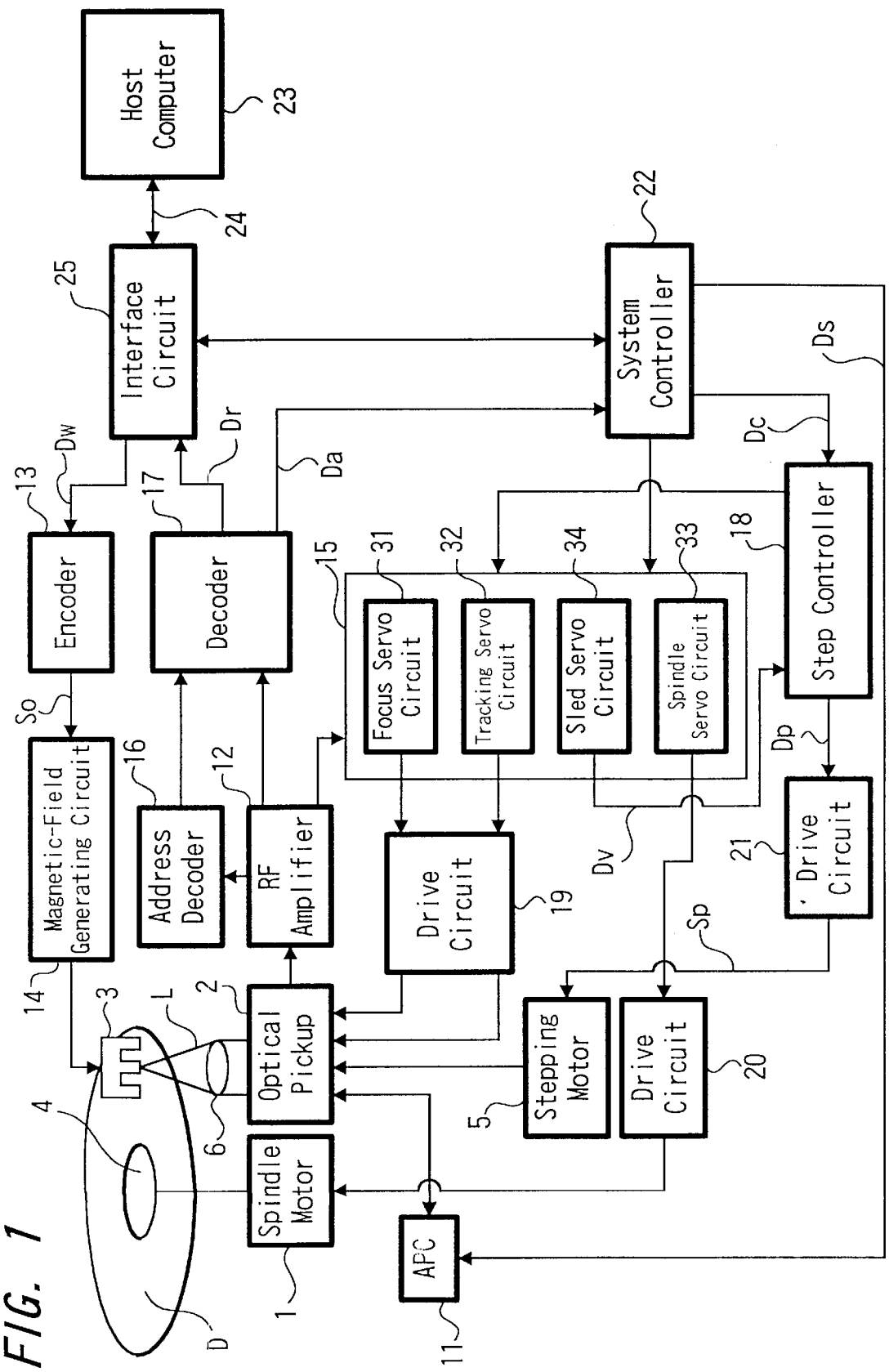
FIG. 1 is a diagram showing an arrangement of a disk apparatus (hereinafter referred to as a disk apparatus according to the embodiment) loaded with a motor control apparatus according to an embodiment of the present invention.

As shown in FIG. 1, the optical disk apparatus according to this embodiment includes a cartridge holder (not shown) into which a disk cartridge (not shown) rotatably housing a magneto-optical disk D of a magnetic-field modulation system therein is inserted, a spindle motor 1 for rotating the magneto-optical disk D housed in the disk cartridge inserted into the cartridge holder, an optical pickup 2 for reproducing an information signal from the magneto-optical disk D, and a recording magnetic-field head (formed by incorporating an excitation coil) 3 for applying a recording magnetic field to the magneto-optical disk D rotated by the spindle motor 1 to thereby magnetize a portion, on which rays of laser light L from the optical pickup 2 are irradiated, of a vertical magnetized film (recording layer) of the magneto-optical disk D (i.e., a portion heated to a temperature exceeding a Curie temperature) in response to a recording signal. In FIG. 1, the disk cartridge, the cartridge holder and so on are not shown in order to avoid a complicated figure.

The cartridge holder is provided with a known shutter opening and closing mechanism (not shown) for opening and closing a shutter of the disk cartridge having an opening portion used to expose the above magneto-optical disk D and the shutter (not shown) for opening and closing the opening portion.

Accordingly, when the disk cartridge is inserted into the cartridge holder, the shutter opening and closing mechanism opens the shutter, and an operation of loading the disk cartridge onto the optical disk apparatus is finished at a position where the shutter is completely opened, i.e., a position where the disk cartridge is completely inserted into the cartridge holder.

The spindle motor 1 is provided at a position below and opposed to a center portion of the loaded disk cartridge. The spindle motor can be freely moved by a known spindle-motor upward/downward lifting mechanism (not shown) formed mainly of, for example, a stepping motor and a rotation-linear movement conversion mechanism, in the upward and downward directions, i.e., in the directions in which the spindle motor is brought close to and away from the disc cartridge. A turn table 4 having a magnet is provided at an upper end of a motor shaft of the spindle motor 1.

When the disk cartridge is loaded onto the cartridge holder, the spindle motor 1 is moved upward by the spindle-motor upward/downward lifting mechanism, and in response to this movement of the spindle motor, the turn table 4 is inserted into the inside of the disk cartridge through the rear surface side opening portion thereof. At this time, an upper surface of the turn table 4 and a center hub of the magneto-optical disk D housed in the disk cartridge are kept in tight contact with each other by attraction of the magnet of the turntable 4, thereby the magneto-optical disk D housed in the disk cartridge being loaded onto the spindle motor 1.

The optical pickup 2 is provided at a position below the above rear surface side opening portion, which is exposed to the inside of the optical disk apparatus, of the disk cartridge. The optical pickup 2 of the optical disk apparatus according to this embodiment can be freely moved by an optical-pickup sliding mechanism (not shown) employing a stepping motor 5 as its drive source in the radius direction of the magneto-optical disk D housed in the disk cartridge.

The optical pickup 2 is formed as a single unit which is the whole optical system including a laser light source, not shown, serving as a light source for light beam L and formed of a semiconductor laser, an objective lens 6 for converging the light beam L on the magneto-optical disk D, and a photodetector for detecting returning light reflected by the magneto-optical disk D to convert the returning light into a electric signal (detection signal) having a current level corresponding to a light amount of the returning light.

Other than the above-mentioned optical parts, this optical system includes a collimator lens for converting the light beam L emitted from the laser light source into parallel light, a phase diffraction grating for dividing the light beam L into at least three luminous flux components, a beam splitter for separating the light beam L emitted from the laser light source from the returning light from the magneto-optical disk D and so on.

The optical system has, in an optical path of the returning light, an imaging lens for converging the returning light on the photosensor and a multi-lens formed of a cylindrical lens and a concave lens for adjusting a focal length of the returning light and producing astigmatism.

The optical system has a photodetector used for monitoring which is provided on the opposite side of the imaging lens side of tho beam splitter and which detects a part (an optical component reflected by a boundary surface of the beam splitter) of the light beams L (P polarization in this embodiment) from the laser light source to convert the detected light beam into an electric signal (detection signal) having an output level (current level) corresponding to a light amount of the optical component.

In this embodiment, characteristics of the beam splitter are set so that a transmittance of P polarization and a reflectivity of S polarization should be respectively set to TP=80% and RS=100%. As a result, 20% of the light beam L incident from the laser light source on the beam splitter are reflected by the boundary surface thereof and made incident on the photodetector used for monitoring.

An optical output control circuit (automatic power control (APC) circuit) 11 for outputting a control signal to the laser light source based on the detection signal from the photodetector used for the monitoring so that the laser light source should oscillate stably is connected to the succeeding stage of the photodetector used for the monitoring. Specifically, the APC circuit 11 controls the laser light source so that an output (light amount) of the light beam L emitted from the laser light source should have a value indicated by a set value data Ds supplied from a system controller 22 described later on and so that the laser light source should stably oscillate. The values indicated by the set value data Ds supplied from the system controller 22 when an information data is reproduced from the magneto-optical disk D and when an information data is recorded on the magneto-optical disk D are different from each other. The values are set so that the output of the light beam L used upon the recording of the information data should be larger than that used upon the reproduction thereof.

The objective lens 6 of the optical pickup 2 is slightly moved by a two-dimensional actuator, not shown, in the direction in which the objective lens 6 is brought close to and away from the magneto-optical disk D and in the radius direction of the magneto-optical disk D. The two-dimensional actuator is formed of a magnetic circuit formed of, for example, a focus coil, a tracking coil and a magnet.

The recording magnetic-field head 3 is provided at a position above an upper side opening portion, exposed to the inside of the optical disk apparatus, of the disk cartridge. The-recording magnetic-field head 3 can be freely moved by a known upward/downward lifting mechanism (not shown) mainly formed of a stepping motor and a rotation-linear movement converting mechanism in the upward and downward directions, i.e., in the direction in which the recording magnetic-field head 3 is brought close to and away from the upper side opening portion of the disk cartridge. The recording magnetic-field head 3 is moved in the radius direction of the magneto-optical disk D by an interlocking mechanism (not shown) with being linked with the optical pickup 2.

As shown in FIG. 1, other than the above APC circuit 11, a circuit system of the optical disk apparatus according to the embodiment has an RF amplifier unit 12, an encoder 13, a magnetic-field generating circuit 14, a servo control circuit 15, an address decoder 16, a decoder 17, an optical-pickup slide controller 18 (simply referred to as a step controller 18) and the system controller 22 for controlling drive circuits 19 to 21 em for various parts and these various circuits. The system controller 22 is connected to a host computer 23 externally provided so that data should be transferred through an interface bus 24 (e.g., SCSI bus) and an interface circuit 25.

The interface circuit 25 interprets contents of a command supplied from the host computer 23 connected to this optical disk apparatus and transfers the contents of the operation command to the system controller 22. The interface circuit 25 also functions as a buffer for transmitting and receiving data to and from the host computer 23. In this case, the interface circuit 25 carries out error correction (with ECC) for disk defects.

The RF amplifier unit 12 converts a light detection signal (current signal) from the photodetector of the optical pickup 2 into a voltage signal to amplify the voltage signal with a predetermined gain. In this embodiment, the RF amplifier unit 12 incorporates three kinds of RF amplifiers (matrix amplifiers). A first RF amplifier of the RF amplifier unit is a circuit for amplifying a tracking error signal and a focus error signal of reproduced signals from the optical pickup 2. A second RF amplifier thereof is a circuit for amplifying a subcode signal of the reproduced signals from the optical pickup 2. A third RF amplifier thereof is a circuit for amplifying a data signal of the reproduced signals from the optical pickup 2.

The encoder 13 subjects a recording data Dw supplied from tho host computer 23 through the interface circuit 25 to an encoding processing such-as an error correction or the like and an EFM modulation to thereby convert the recording data Dw into recording information data. Further, the encoder 13 converts the recording information data into binary data to thereby output the recording data Dw as an on/off signal So to the magnetic-field generating circuit.

The magnetic-field generating circuit 14 switches a direction of a current supply to the excitation coil provided in the recording magnetic-field head 3 to a positive direction or a negative direction based on the on/off signal So from the encoder 13.

Specifically, when the current flows through the excitation coil in the positive direction, the portion, heated over the Curie temperature by irradiation of the laser light from optical pickup 2, of the recording layer of the magneto-optical disk D is magnetized in the positive direction, for example, and when the current flows through the excitation coil in the negative direction, the portion thereof is magnetized in the negative direction.

Then, the optical pickup 2 irradiates rays of reproduction laser light L on the magneto-optical disk. A photosensor formed of a pn junction photodiode, for example, incorporated in the optical pickup 2 detects a Kerr rotation angle included in a luminous flux of the reflected light modulated at the portion magnetized in the positive direction or the portion magnetized in the negative direction. Thus, the optical disk apparatus can obtain a reproduced signal recorded on the magneto-optical disk D in the form of a magnetization information.

The decoder 17 is a circuit for converting a signal, which is obtained by subjecting to a predetermined calculation the reproduced signal from the third RF amplifier and more specifically the P polarization components and the S polarization components of the reflected light modulated in response to the magnetization information recorded on the recording layer of the magneto-optical disk D, into a digital data and for decoding the converted digital data once subjected to the encoding processing such as error correction or the like to output the decoded signal as a reproduced data Dr. The decoder 17 supplies the reproduced data Dr to the host computer 23 externally connected through the interface circuit 25 and the interface bus 24.

The address decoder 16 is a circuit for decoding the subcode signal from the second RF amplifier to obtain an address data Da. The address decoder 16 supplies the address data Da through the decoder 17 at the succeeding stage thereof to the system controller 22 so that the system controller 22 can control rotation of the spindle motor 1 and a scanning position of the optical pickup 2 upon the seek operation.

The servo control circuit 15 incorporates therein a focus servo circuit 31, a tracking servo circuit 32, a spindle servo circuit 33, a sled servo circuit 34, a motor servo circuit (not shown) for effecting servo control on a motor which is a drive source of various moving mechanisms, and so on. These servo circuits are inputted with a servo drive and control signal such as servo control data (e.g., a servo gain and so on) from the system controller 22, a drive signal or the like, and various error signals from the RF amplifier unit 12.

The spindle servo circuit 33 drives the spindle motor 1 at a rotation number less than the maximum rotation number based on a data of the maximum rotation number from the system controller 22, and rotates the magneto-optical disk D loaded on the turntable 4 in a constant linear velocity (CLV) system or a constant angular velocity (CAV) system. The spindle servo circuit 33 may rotates the magneto-optical disk D in accordance with a zone constant angular velocity (ZVAV) system in which a plurality of zones are allocated in the radius direction of the magneto-optical disk D and the magneto-optical disk D is rotated in accordance with the CAV system with respect to each of the Zones.

The above focus servo circuit 31 drives and controls the above two-dimensional actuator of the optical pickup 2 based on a focus error signal from the RF amplifier unit 12, i.e., specifically based on a signal obtained when the RF amplifier unit 12 subjects to a predetermined calculation a detection signal resulting from irradiation of the laser light on a mirror surface formed on the magneto-optical disk D and corresponding to an amount of reflected light from the mirror surface. Thus, the objective lens 6 is moved in the direction in which the objective lens 6 is brought close to and away from the magneto-optical disk D to thereby adjust a focal point thereof.

The above tracking servo circuit 32 drives and controls the two-dimensional actuator of the optical pickup 2 based on a tracking error signal from the RF amplifier unit 12, i.e., specifically based on a signal obtained when the RF amplifier unit 12 subjects to a predetermined calculation a detection signal resulting from detection of a servo pit in the servo region formed on the magneto-optical disk D. Thus, the objective lens 6 is moved in the radius direction of the magneto-optical disk D to thereby adjust the tracking.

The sled servo circuit 34 is a circuit for comparing a target position data successively supplied from the system controller 22 with a data indicative of a current position of the optical pickup 2 to thereby set a movement speed profile Dv.

The step controller 18 is a circuit for generating, based on the step number described later on from the system controller 22 and the movement speed profile Dv from the sled servo circuit 34, an excitation pattern Dp to be supplied to the stepping motor 5 to output the excitation pattern Dp to the drive circuit 21 of the stepping motor 5. The excitation pattern Dp includes a pulse number corresponding to the step number Dc from the system controller 22 and has a supply pattern corresponding to an order of excitation phases corresponding to a polarity of the step number Dc of a pulse signal Sp having a frequency corresponding to the movement speed profile Dv.

The drive circuit 21 is a circuit for amplifying the pulse signal Sp included in the excitation pattern Dp from the step controller 18 to thereby supply the pulse signal Sp to the stepping motor 5 in accordance with the supply order of the excitation phase indicated by the excitation pattern Dp.

The system controller 22 has a processing means 51 (seek processing means) for making the optical pickup 2 seeking the track on or from which data is recorded or reproduced, based on a data recording request from the interface circuit 25 or a data reproducing request therefrom.

The seek processing means 51 will hereinafter be described. A hardware arrangement of the system controller 22 will be described with reference to FIG. 2 before starting the description of the seek processing means.

Figure 2:
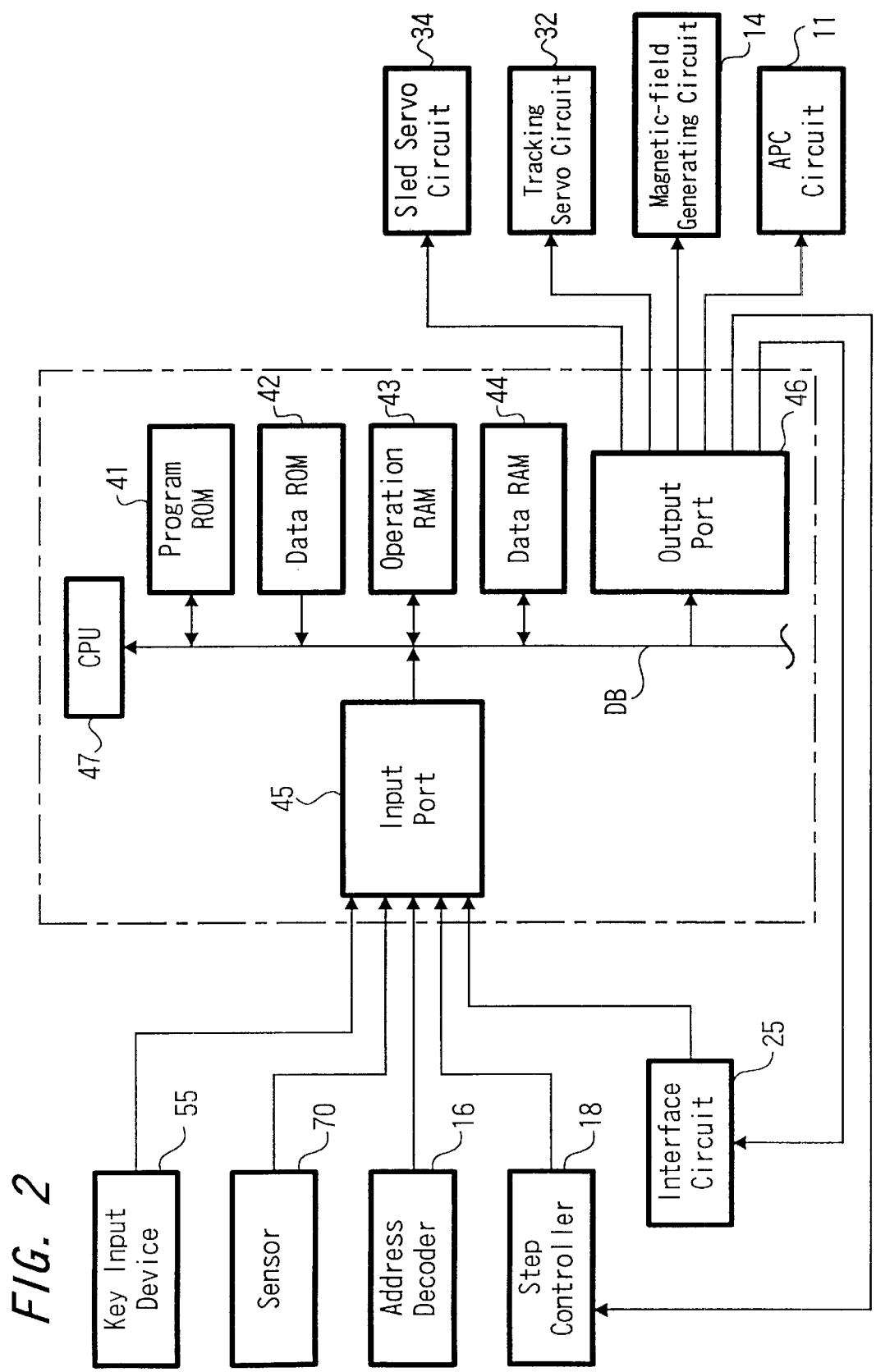
FIG. 2 is a block diagram showing a hardware arrangement of a system controller according to the embodiment.

As shown in FIG. 2, the system controller 22 has a program ROM 41 for storing various programs for the above seek processing means and so on, a data ROM 42 in which various fixed data are previously registered, an operation RAM 43 used for an operation of the program read out from the above program ROM 41, a data RAM 44 for storing data and the control signals from the step controller 18, data processed in various programs or the like, an input port 45 and an output port 46 for respectively inputting and outputting data from and to an external circuit, and a CPU (control device and a logical arithmetic device) 47 for controlling the above various circuits.

The above various circuits transmit and receive data through a data bus DB derived from the CPU 47 among one another. Moreover, the above various circuits are controlled by the CPU 47 through an address bus and a control bus (both of which are not shown) derived from the CPU 47.

A processing of the above seek processing means 51 of the system controller 22 will be described with reference to FIGS. 3 to 10 which are functional block diagrams thereof and flowcharts therefor.

Figure 4:
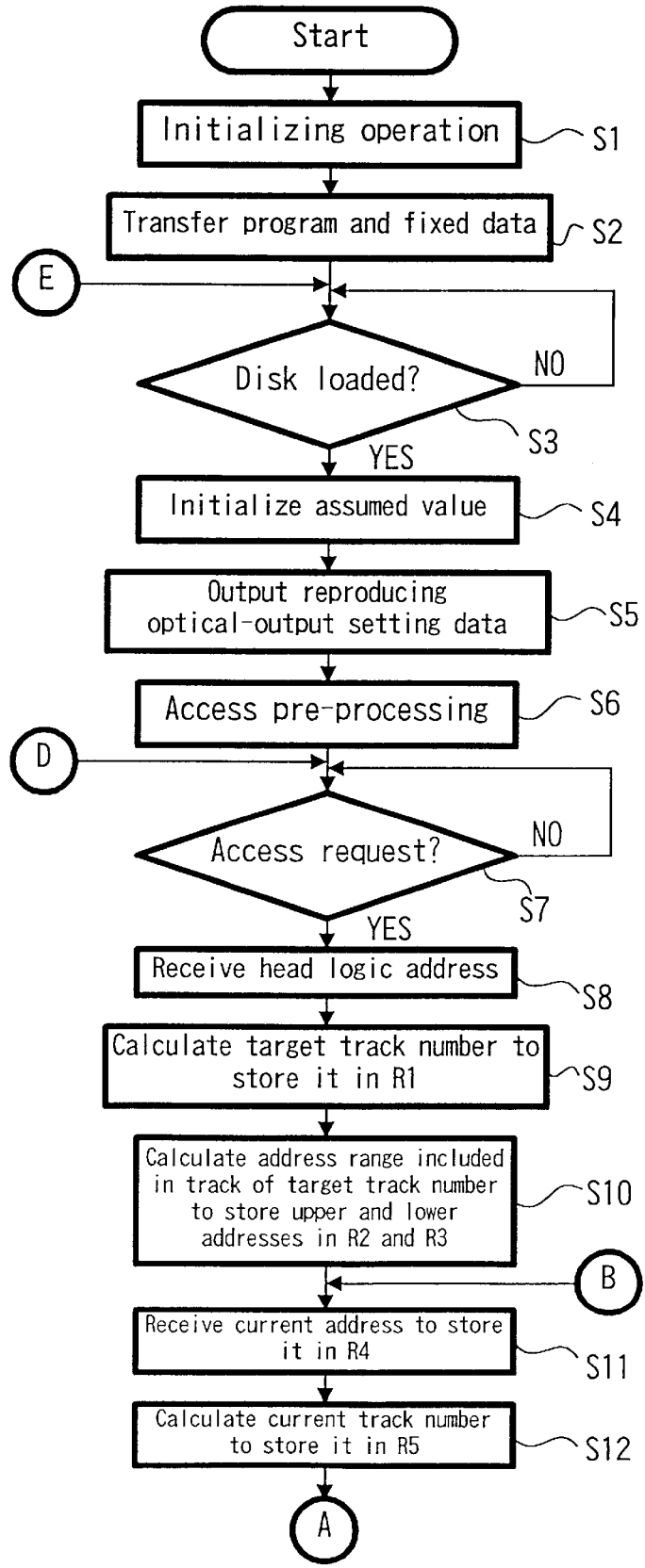
FIG. 4 is a flowchart (part 1) used to explain a processing of the seek processing means.

In step S1 of the flowchart shown in FIG. 4, simultaneously with energizing the optical disk apparatus, the system controller 22 carries out its initial operation such as, for example, a system check of the system controller 22, a memory check thereof, a setup therefor or the like. Then, the processing proceeds to step S2.

In step S2, the seek processing means 51 (which is a seek processing program: see FIG. 3) is read out from the program ROM 41 and stored in the operation RAM 43. At the same time, a work area used for temporarily storing data generated during operation of this seek processing program and for transmitting and receiving parameters between routines forming the seek processing program is allocated in the operation RAM 43.

A track pitch storage area for storing a track pitch Tp which is an assumed value to be corrected and a fixed data storage area for storing various fixed data from the data ROM 42 are allocated to the data RAM 44.

The fixed data storage area has a unit-forward distance storage area for storing a one-step forward distance Sp (Sp=67 $\mu$m in this embodiment), an updated value storage area for storing an updated value Td obtained every time when the assumed value is corrected (Td=0.03 $\mu$m in this embodiment), a correction-necessity discrimination value storage area for storing two kinds of reference values used for discriminating whether or not the assumed value is to be corrected (first and second correction-necessity determination values $\alpha$ (=100), $\beta$ (=160)), an upper limit correction value storage area for storing an upper limit value A used for correcting the assumed value (A=1.7 $\mu$m in this embodiment), and a lower limit correction value storage area for storing a lower limit value B used for correcting the assumed value (B=1.5 $\mu$m in this embodiment).

In step S2, other than the above program transfer processing, a processing for reading the various fixed data from the data ROM 42 to store them in the fixed data storage area is carried out. Then, the processing proceeds to S3, wherein the processing enters the seek processing program.

Figure 3:
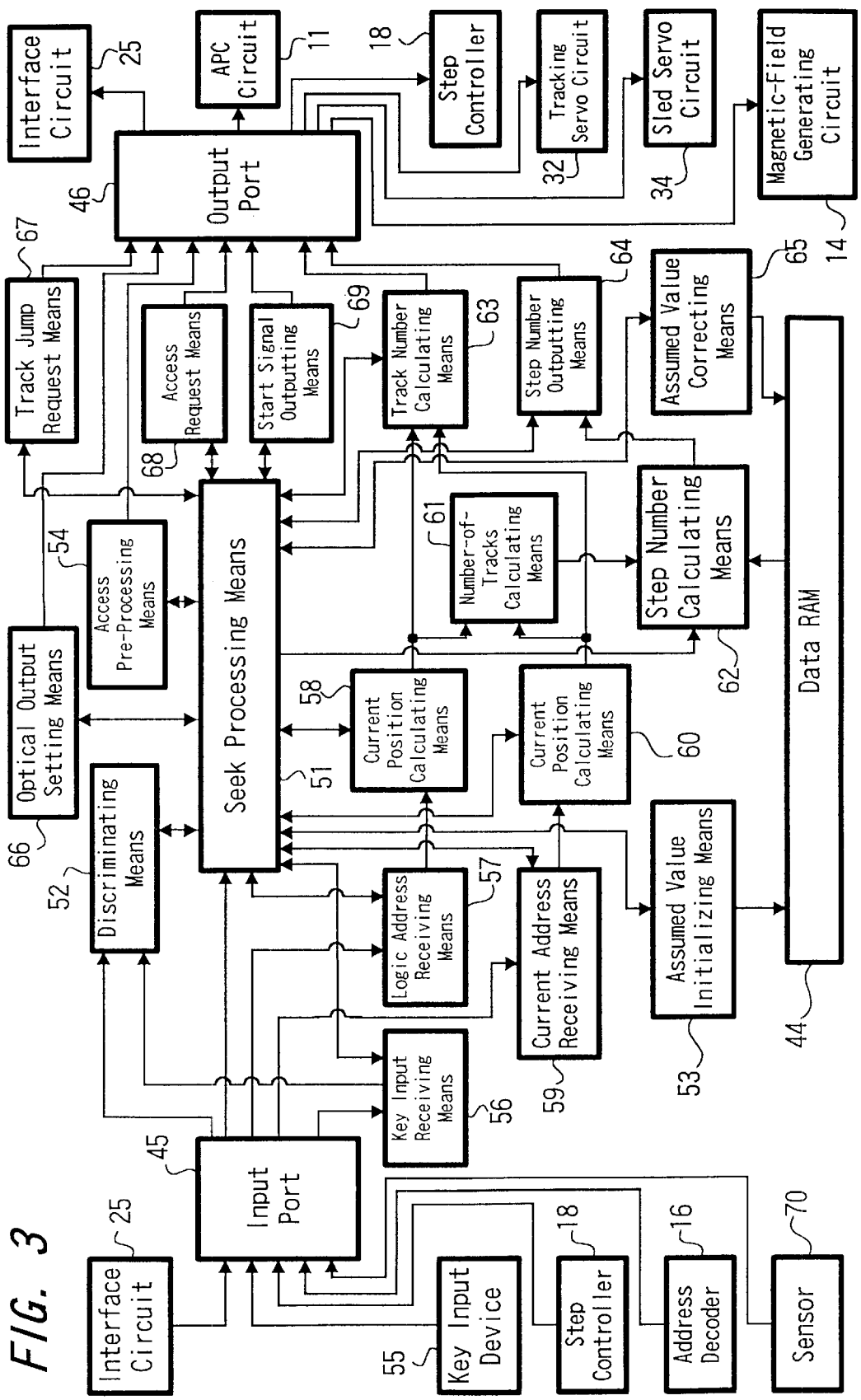
FIG. 3 is a diagram showing functional blocks of a seek processing means incorporated in the system controller according to the embodiment.

As shown in FIG. 3, the seek processing means (the seek processing program) 51 read out from the program ROM 41 and then stored in the operation RAM 43 has a discriminating means 52 for carrying out various discrimination operations, an assumed value initializing means 53 for initializing an assumed value, an access pre-processing means 54 for carrying out a pre-processing such as a processing of reading a TOC data from a magneto-optical disk D before a processing of accessing the magneto-optical disk D, a key-input receiving means 56 for receiving a key input data input from a key input device 55 through an input port 45, a logic address receiving means 57 for receiving a head logic address input from the interface circuit 25 through the input port 45 upon a request to record or reproduce data, a target position calculating means 58 for calculating a target track number (CTN) and a range of addresses contained in a track of the target track number based on the head logic address received by the logic address receiving means 57, a current address receiving means 59 for receiving a current address input from the address decoder 16 through the input port 45, a current position calculating means 60 for calculating a current track number (TNO) based on the current address received by the current address receiving means 59, a number-of-tracks calculating means 61 for calculating the number trk_def of tracks over which the optical pickup 2 is moved, based on the target track number (CTN) obtained by the target position calculating means 58 and the current track number (TNO) obtained by the current position calculating means 60, a step number calculating means 62 for a step number Nsp based on the number trk_def of tracks obtained by the number-of-tracks calculating means 61, the track pitch Tp and so on, a track number outputting means 63 for outputting the target track number (CTN) and the current track number (TNO) through the output port 46 to the sled servo circuit 34, a step number outputting means 64 for outputting the step number Nsp obtained by the step number calculating means 62 through the output port 46 to the step controller 18, an assumed value correcting means 65 for correcting the assumed value, an optical output setting means 66 for outputting an optical output setting data through the output port 46 to the APC circuit 11, a track jump request means 67 for outputting a track jump request signal through the output port 46 to the tracking servo circuit 32, an access request means 68 for requesting the interface circuit 25 through the output port 46 to output recorded data or to receive the reproduced data, and a start signal outputting means 69 for outputting a start signal through the output port 46 to the magnetic-field generating circuit 14 upon request of data recording.

In the seek processing program 51, in step S3 of the flowchart shown in FIG. 4, the discriminating means 52 discriminates whether or not the magneto-optical disk D is loaded onto the optical disk apparatus. The discriminating means 52 carries out this discrimination by discriminating whether or not a detection signal from a sensor 70 for detecting that the magneto-optical disk D is loaded onto the optical disk apparatus. The processing in step S3 is repeatedly carried out until the magneto-optical disk D is loaded onto the optical disk apparatus, i.e., the seek processing program 51 is brought in its standby state for the loading of the magneto-optical disk D. Then, the processing proceeds to step S4.

In step S4, the assumed value initializing means 53 stores the initial value (which is data indicative of 1.6 $\mu$m in this embodiment) in the track pitch storage area, i.e., the track pitch Tp=1.6 $\mu$m is set. Then, the processing proceeds to step S5.

In step S5, the optical output setting means 66 outputs a reproduction optical output setting data Ds to the APC circuit 11. The APC circuit 11 controls the laser output emitted from the laser light source of the optical pickup 2, based on the reproduction optical output setting data Ds input from the system controller 22, so that the laser output should be an output for reproduction. Then, the processing proceeds to step S6.

In step S6, the access pre-processing means 54 carries out the pre-processing such as the operation of reading out the TOC data from the magneto-optical disk D before the processing of accessing the magneto-optical disk D. Then, the processing proceeds to step S7.

In step S7, the discriminating means 52 discriminates whether or not the access request is issued. The discriminating means 52 carries out this discrimination processing by discriminating whether or not the interface circuit 25 has issued a data recording request or a data reproduction request. The processing in step S7 is repeatedly carried out until the access request is issued, i.e., the seek processing means 51 is brought in its standby state for the access request. Then, the processing proceeds to step S8.

In step S8, the logic address receiving means 57 receives the head logic address included in a data recording request parameter or a data reproduction request parameter supplied from the interface circuit 25. Then, the processing proceeds to S9.

In step S9, the target position calculating means 58 converts the received head logic address into a physical address and then calculates the target track number (CTN) based on the physical address to store the calculated target track number (CTN) in a first register R1 Then, the processing proceeds to step S10.

In step S10, the target position calculating means 58 calculates the address range included in the track of the target track number (CTN) and stores an upper-order address UADR thereof and a lower-order address LADR thereof in second and third registers R2, R3, respectively. Then, the processing proceeds to step S11.

In step S11, the current address receiving means 59 receives a current address ADR input from the address decoder 16 through the input port 45 to store the current address ADR in a fourth register R4. Then, the processing proceeds to step S12.

In step S12, the current position calculating means 60 calculates a current track number (TNO) based on the present address ADR stored in the fourth register to store the current track number (TNO) in a fifth register R5. Then, the processing proceeds to step S13.

Figure 5:
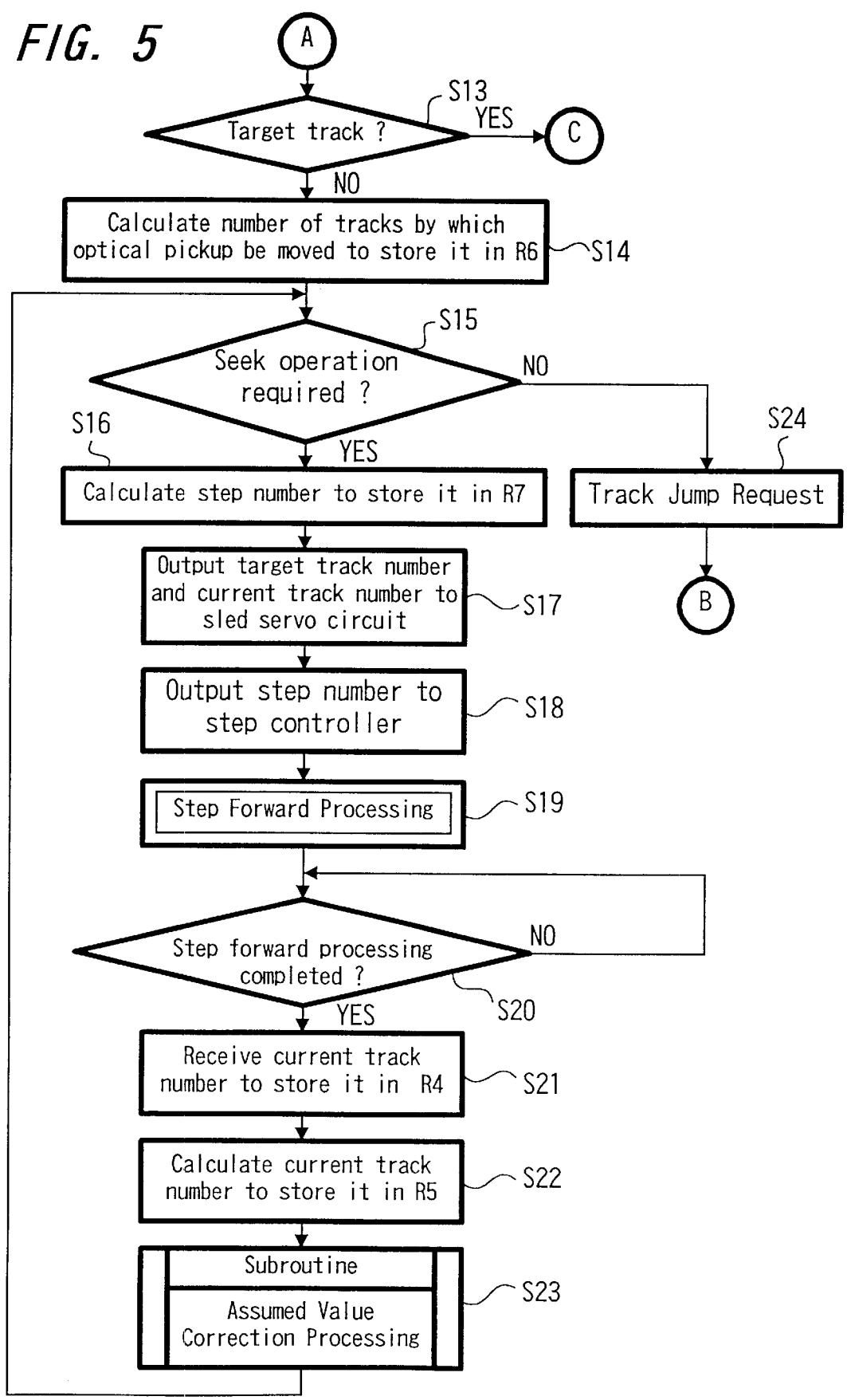
FIG. 5 is a flowchart (part 2) used to explain the processing of the seek processing means.

In step S13 of the flowchart of shown in FIG. 5, the discriminating means 52 discriminates whether or not the current address ADR is included within the address range of the track of the target track number (CTN), i.e., whether or not the optical pickup 2 has reached the target track (CTN).

If it is determined in step S13 that the optical pickup 2 has not reached the target track, then the processing proceeds to step S14, wherein the number-of-tracks calculating means 61 calculates the number trk_def of the tracks by which the optical pickup 2 is to be moved. The number-of-tracks calculating means 61 carries out this calculation by subtracting the current track number from the target track number (trk_def=CTN−TNO). The calculated number trk_def of tracks is stored in a sixth register R6. Then, the processing proceeds to step S15.

In step S15, the discriminating means 52 discriminates whether or not the seek operation is required. The discriminating means 52 carries out this discrimination by determining whether or not a value of the number trk_def of tracks is larger than the value of 1 stored in the sixth register R6. If it is discriminated in step S15 that the number trk_def of tracks is larger than 1, then it is determined in step S15 that the seek operation is required, and the processing proceeds to step S16.

In step S16, the step number calculating means 62 calculates the number Nsp of steps required for the seek operation. The step number calculating means 62 calculates the step number Nsp by dividing the one-step forward distance Sp stored in the unit-forward distance storage area by the track pitch Tp stored in the track pitch storage area to then divide the number trk_def of tracks stored in the sixth register R6 by the above quotient. The calculated step number Nsp is stored in a seventh register R7. Specifically, the step number calculating means 62 calculates the following equation.

$$Nsp=trk\_def/(Sp/Tp)$$

When the calculation of the step number Nsp is finished, the processing proceeds to step S17, wherein the track number outputting means 63 outputs through the output port 46 to the sled servo circuit 34 the target track number (CTN) and the current track number (TNO) respectively stored in the first and fifth registers R1 and R5. The sled servo circuit 34 compares the target track number (CTN) and the current track number (TNO) supplied from the system controller 22 to thereby set the movement speed profile Dv. The sled servo circuit 34 outputs the movement speed profile Dv to the step controller 18. Then, the processing proceeds to step S18.

In step S18, the step number outputting means 64 outputs the step number Nsp stored in the seventh register R7 through the output port 46 to the step controller 18. Then, the processing proceeds to step S19.

In step S19, a step forward processing is carried out. The step controller 18 generates an excitation pattern Dp to be supplied to the stepping motor 5, based on the step number Nsp supplied from the system controller 22 and the movement speed profile Dv supplied from the sled servo circuit 34, and then outputs the generated excitation pattern Dp to the drive circuit 21 for driving the stepping motor 5. The stepping motor 5 moves the optical pickup 2 in the radius direction of the magneto-optical disk D in accordance with the excitation pattern Dp from the step controller 18. When the operation of outputting the excitation pattern Dp to the drive circuit 21 is finished, the step controller 18 outputs a signal indicative of completion thereof to the system controller 22. Then, the processing proceeds to step S20.

In step S20, the discriminating means 52 discriminates whether or not the step forwarding processing is completed. The discriminating means 52 carries out this discrimination by determining whether or not the completion signal is supplied from the step controller 18. The processing in step S20 is repeatedly carried out until the above completion signal is input therefrom, i.e., the seek processing means 51 is brought in its standby state for the input of the completion signal.

When the completion signal is input from the step controller 18, the processing proceeds to step S21, wherein the current address receiving means 59 receives the current address ADR input thereto from the address decoder 16 through the input port 45 to store the current address ADR in the fourth register R4. Then, the processing proceeds to step S22.

In step S22, the current position calculating means 60 calculates the current track number (TNO) based on the current address ADR stored in the fourth register R4 to store the current track number (TNO) in the fifth register R5. Then; the processing proceeds to step S23.

In step S23, the processing proceeds to the processing of the assumed value correcting means 65 (an assumed-value correcting subroutine).

Figure 7:
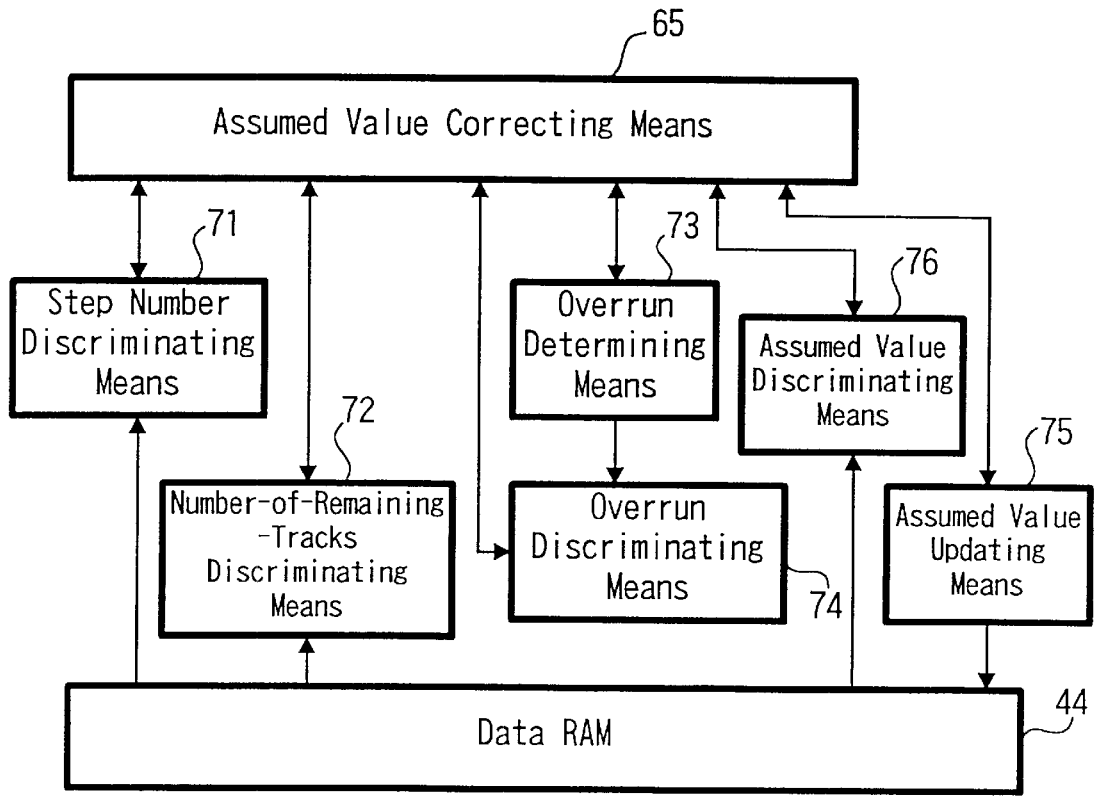
FIG. 7 is a diagram showing functional blocks of an assumed value correcting means of the seek processing means.

As shown in FIG. 7, the assumed value correcting means 65 has a step number discriminating means 71 for discriminating whether or not the assumed value Tp must be corrected based on the step number Nsp and a first correction-necessity discrimination value α, a number-of-remaining-tracks discriminating means 72 for determining whether or not the assumed value Tp must be corrected based on the number trk_def of remaining tracks and a second correction-necessity discrimination value β, an overrun determining means 73 for determining whether the optical pickup 2 has passed the target position or does not reach it and for supplying an information of a result of this determination to the assumed value correcting means 65, an overrun discriminating means 74 for discriminating based on the information from the overrun determining means 73 whether or not the optical pickup 2 overruns the target position, an assumed value updating means 75 for updating the assumed value Tp with a predetermined update value Td, and an assumed value discriminating means 76 for comparing the corrected assumed value Tp with the upper-limit correction value A or the lower-limit correction value B.

Figure 9:
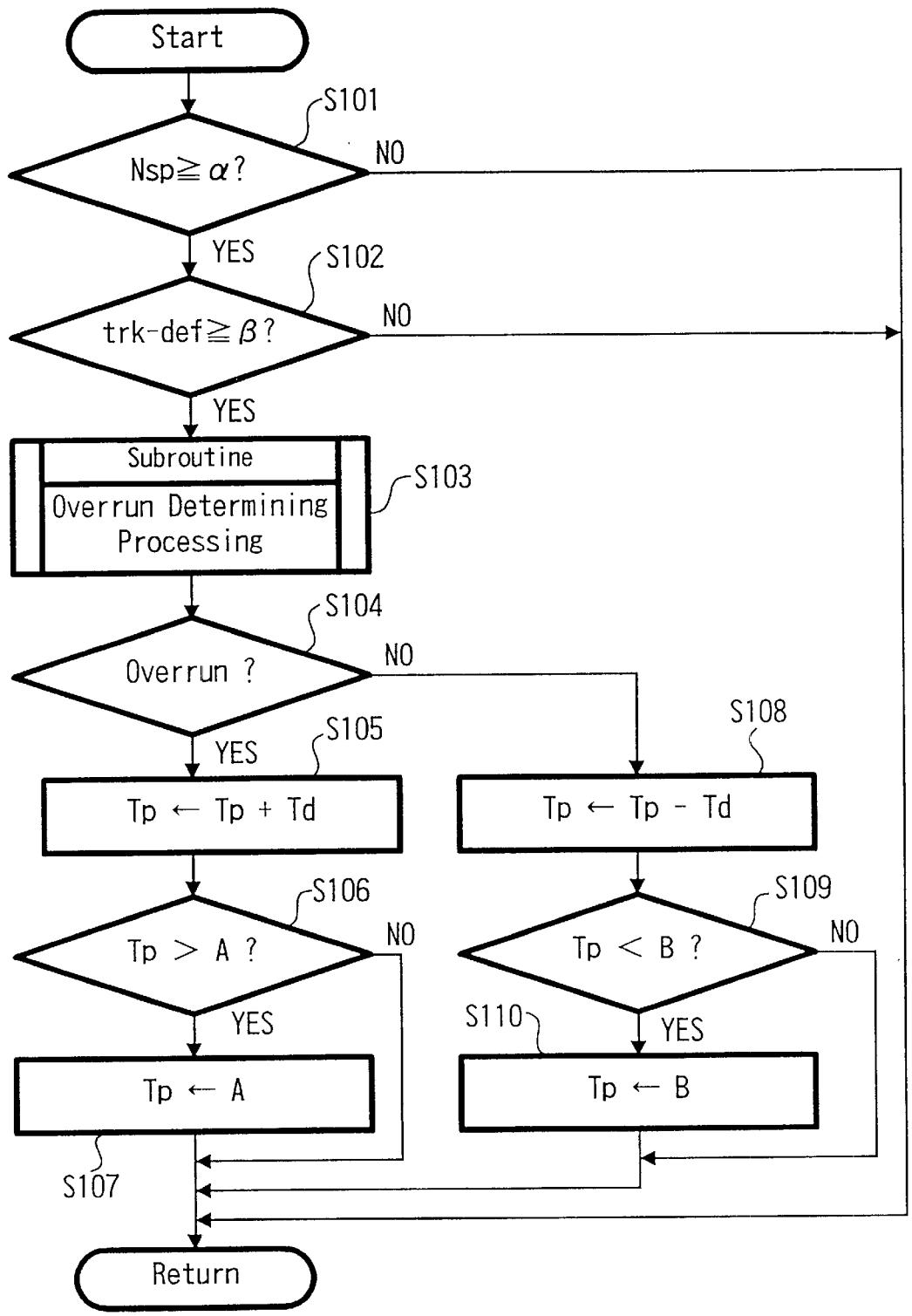
FIG. 9 is a flowchart used to explain a processing of the assumed value correcting means.

As shown in FIG. 9, in step S101 of the processing of the assumed value correction means 65 (the assumed value correction subroutine), the step number discriminating means 71 carries out a first discrimination for discriminating whether or not the assumed value Tp must be corrected. The step number discriminating means 71 carries out the first discrimination by determining whether or not the step number Nsp stored in the seventh register R7 is equal to or larger than the first correction-necessity discrimination value α (=100) stored in the correction-necessity discrimination value storage area.

If it is determined in step S101 that the step number Nsp is equal to or larger than the first correction-necessity value α, then the processing proceeds to step S102, wherein the number-of-remaining-tracks discriminating means 72 carries out a second discrimination for determining whether or not the assumed value Tp must be corrected. The number-of-remaining-tracks discriminating means 72 carries out the second discrimination by determining whether or not the number trk_def of the tracks stored in the sixth register R6 is equal to or larger than the second correction-necessity discrimination value β (=160) stored in the correction-necessity discrimination value storage area.

If it is determined in step S102 that the number trk_def of remaining tracks is equal to or larger than the second correction-necessity discrimination value β, then the processing proceeds to the next step S103, wherein the processing proceeds to a processing or the overrun determining means 73 (an overrun determining subroutine).

Figure 8:
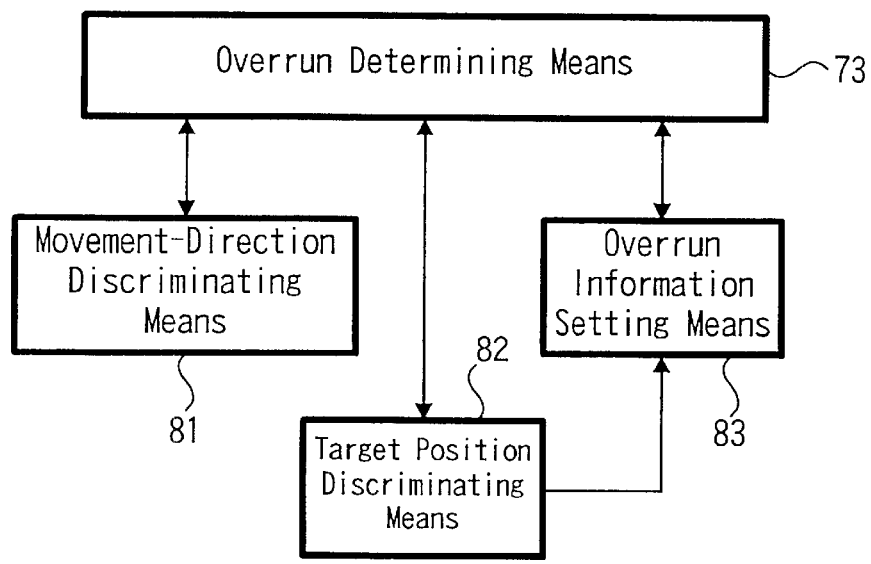
FIG. 8 is a diagram showing functional blocks of an overrun discriminating means of the seek processing means.

As shown in FIG. 8, the overrun determining means 73 has a movement-direction discriminating means 81 for discriminating whether the optical pickup 2 is moved to an outer-periphery side of the magneto-optical disk D or an inner-periphery side thereof, a target position discriminating means 82 for discriminating whether the target position is located on the outer-periphery side or the inner-periphery side with respect to the current position of the optical pickup 2, and an overrun information setting means 83 for setting an information indicative of "overrun" or "short of movement" based on discriminated results of the respective discriminating means 81, 82.

As shown in FIG. 10, in step S201 of a processing of the overrun determining means 73 (an overrun determination subroutine), the movement-direction discriminating means 81 determines whether the optical pickup 2 is moved to the outer-periphery side of the magneto-optical disk or the inner-periphery side thereof. The movement-direction discriminating means 81 carries out this discrimination by determining whether a polarity of the number trk_def of the tracks stored in the sixth register R6 is "positive" or "negative".

If it is determined in step S201 that the polarity of the number trk_def of the tracks is "negative" and hence the optical pickup 2 is moved to the outer-periphery side, then the processing proceeds to step S202, wherein the target position discriminating means 82 determines whether the target position is located on the outer-periphery side of the magneto-optical disk D or the inner-periphery side thereof with respect to the current position of the optical pickup 2. The target position discriminating means 82 carries out this discrimination by determining whether or not the current track number (TNO) stored in the fifth register R5 is larger than the target track number (CTN).

If it is determined in step S202 that the current track number (TNO) is larger than the target track number (CTN) and hence the target position is located on the outer-periphery side with respect to the current position of the optical pickup 2, then the processing proceeds to step S203, wherein the overrun information setting means 83 sets the information indicative of "short of movement". Specifically, a value of "0" is stored in the eighth register R8.

If it is determined in step S202 that the current track number (TNO) is smaller than the target track number (CTN) and hence the target position is located on the inner-periphery side with respect to the current position of the optical pickup, then the processing proceeds to step S204, wherein the overrun information setting means 83 sets the information indicative of "overrun". Specifically, a value of "1" is stored in the eighth register R8. When the processing in step S203 or S204 is finished, the overrun determination subroutine 73 is finished.

If on the other hand it is determined in step S201 hence the polarity of the number trk_def of tracks is "positive" and that the optical pickup 2 is moved to the inner-periphery side, then the processing proceeds to step S205, wherein the target position discriminating means 82 discriminates whether the target position is located on the outer-periphery side of the magneto-optical disk D or the inner-periphery side thereof with respect to the current position of the optical pickup. The target position discriminating means 82 carries out this discrimination similarly to the discrimination carried out in step S202.

If it is determined in step S205 that the current track number (TNO) is larger than the target track number (CTN) and hence the target position is located on the outer-periphery side with respect to the current position of the optical pickup 2, then the processing proceeds to step S206, wherein the overrun information setting means 83 sets the information indicative of the "overrun". Specifically, the value of "1" is stored in the eighth register R8.

If it is determined in step S205 that the current track number (TNO) is smaller than the target track number (CTN) and hence the target position is located on the inner-periphery side with respect to the current position of the optical pickup 2, then the processing proceeds to step S207, wherein the overrun information setting means 83 sets the information indicative of "short of movement". Specifically, the value of "0" is stored in the eighth register R8. When the processing in step S206 or S207 is finished, the overrun determination subroutine 73 is finished.

The processing returns to the processing of the assumed value correction subroutine 65 shown in FIG. 9 and proceeds to step S104. In the next step S104, the overrun discriminating means 74 discriminates whether the optical pickup 2 overruns or is stopped short of the target position.

If the value of the eighth register R8 is "1" and hence it is determined in step S104 that the optical pickup 2 "overruns", then the processing proceeds to step S105, wherein the assumed value updating means 75 increases the assumed value Tp to thereby update it. The assumed value updating means 75 increase the assumed value Tp to thereby update it, by adding the track pitch Tp stored in the track pitch storage area with the update value Td stored in the update value storage area to store the added value as a new track pitch Tp in the track pitch storage area again. Then, the processing proceeds to step S106.

In step S106, the assumed value discriminating means 76 discriminates whether or not the track pitch Tp which is the assumed value exceeds the upper-limit correction value A. The assumed value discriminating means carries out this discrimination by determining whether or not the track pitch Tp stored in the track pitch storage area exceeds the upper-limit value A stored in the upper-limit correction value storage area.

If it is determined in step S106 that the track pitch Tp is larger than the upper-limit correction value A, then the processing proceeds to step S107, wherein the assumed value updating means 75 stores a value of 1.7 μm which is the upper-limit correction value A as the new track pitch Tp in the track pitch storage area.

If on the other hand it is determined in step S104 that the value of the eighth register R8 is "0" and hence the optical pickup 2 is stopped short of the target position, then the processing proceeds to step S108, wherein the assumed value updating means 75 decreases the assumed value Tp to thereby update it. The assumed value updating means 75 decreases the assumed value Tp to thereby update it, by subtracting the update value Td stored in the update value storage area from the track pitch Tp stored in the track pitch storage area to store the subtracted value as the new track pitch Tp in the track pitch storage area again. Then, the processing proceeds to step S109.

In step S109, the assumed value discriminating means 76 discriminates whether or not the tack pitch Tp which is the assumed value is smaller than the lower-limit correction value B. The assumed value discriminating means 76 carries out this discrimination by determining whether or not the track pitch Tp stored in the track pitch storage area is smaller than the lower-limit correction value B stored in the lower-limit correction value storage area.

If it is determined in step S109 that track pitch Tp is smaller than the lower-limit correction value B. then the processing proceeds to step S110, wherein the assumed value updating means 75 stores a value of 1.5 μm which is the lower-limit correction value B as the new track pitch Tp in the track pitch storage area.

When the processing in step S107 is finished, when it is determined in step S106 that the track pitch Tp is equal to or smaller than the upper-limit correction value A. when the processing in step S110 is finished, when it is determined in step S109 that the track pitch Tp is equal to or larger than the lower-limit correction value B, when it is determined in step S102 that the number trk_def of tracks is smaller than the second correction-necessity discrimination value β, or when it is determined in step S101 that the step number Nsp is smaller than the first correction-necessity discrimination value α, the processing of the assume d-value correction subroutine 65 is finished.

The processing returns to the main routine shown in FIG. 5. When the processing in step S23 carried out by th e assumed-value correcting means 65 is finished, the processing returns to step S15, and thereafter the processings in step S15 and in the succeeding steps are repeatedly carried out. Specifically, if the discriminating means 52 determines that the seek operation is required, then the step number calculating means 62 calculates the step number Nsp based on the above corrected assumed value Tp, and the stepping motor 5 moves the optical pickup 2 by step based on the step number Nsp. Further, if it is determined that the assumed value Tp must be corrected, then the assumed value correcting means 65 carries out the processing of correcting the assumed value Tp again.

If it is determined in step S15 that an absolute value of the number trk_def of tracks stored in the sixth register R6 is a value of 1 and hence the seek operation is unnecessary, then the processing proceeds to step S24, wherein the track jump request means 67 outputs the track-jump request signal through the output port 46 to the tracking servo circuit 32. The tracking servo circuit 32 carries out the processing of moving the objective lens 6 of the optical pickup 2 toward the outer-periphery side of the magneto-optical disk D or the inner-periphery side thereof by one track amount, based on the track-jump request signal input from the system controller 22 and its attribute.

When the processing in step S24 is finished, then the processing returns to step S11, and then the processings in step S11 and the succeeding steps are repeatedly carried out.

Figure 6:
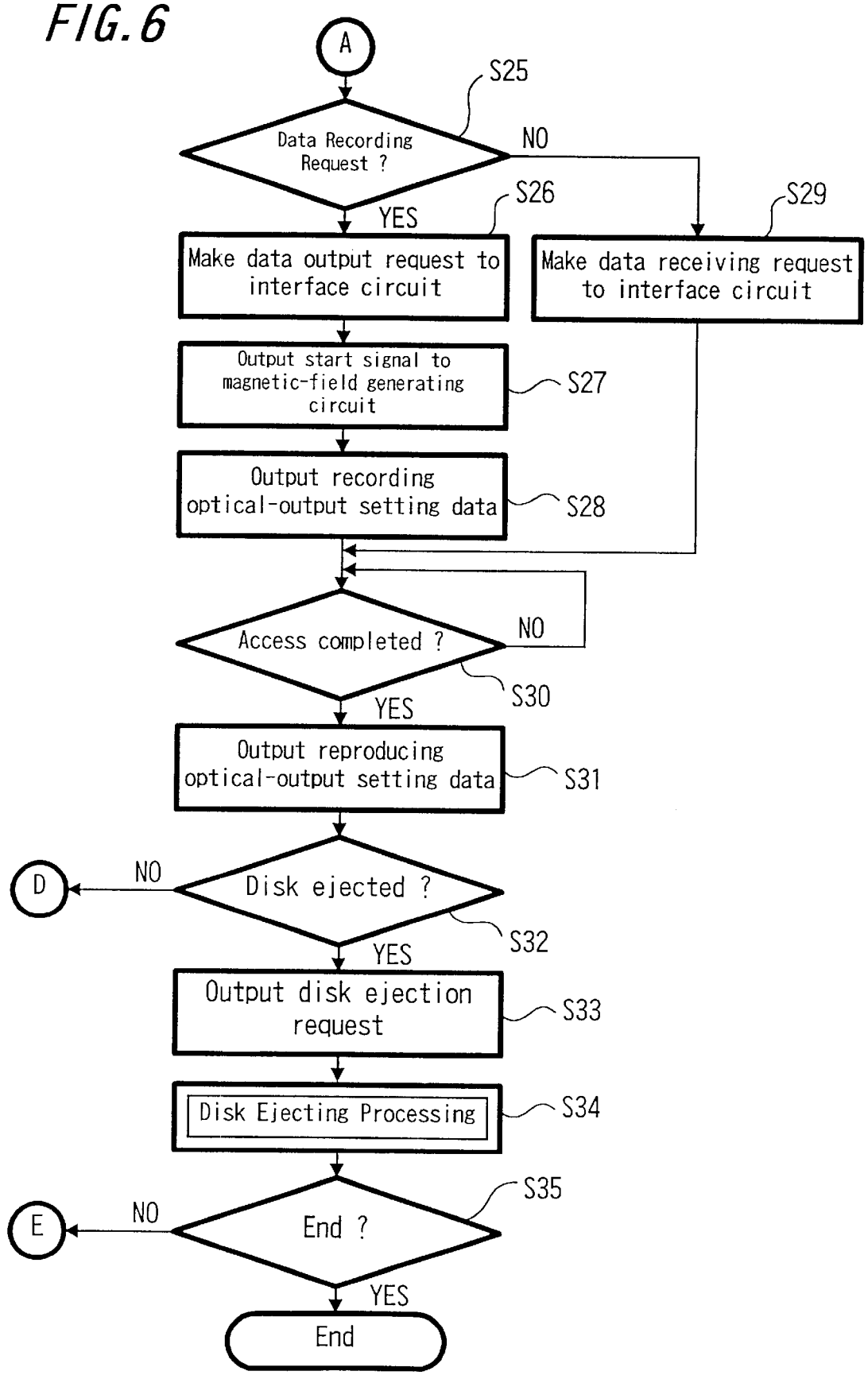
FIG. 6 is a flowchart (part 3) used to explain the processing of the seek processing means.

If the seek operation processing and the track jump processing have already been carried out and it is determined in step S13 that the optical pickup 2 reaches the target track, then the processing proceeds to step S25 shown in FIG. 6, wherein the discriminating means 52 discriminates whether or not the present access request is a data access request. If it is determined in step S25 that the present access request is the data recording request, then the processing proceeds to step S26, wherein the access request means 68 outputs a data output request command through the output port 46 to the interface circuit 25.

Based on the data output request command issued from the system controller 22, the interface circuit 25 outputs the recording data Dw from the host computer 23, which has been kept in its standby state for the output, to the encoder 13. Then, the processing proceeds to step S27.

In step S27, the start signal outputting means 69 outputs a start signal through the output port 46 to the magnetic-field generating circuit 14 to thereby activate (energize) the magnetic-field generating circuit 14. Then, the processing proceeds to step S28.

In step S28, the optical output setting means 66 outputs a recording optical-output setting data Ds through the output port 46 to the APC circuit 11. Based on the recording optical-output setting data Ds input from the system controller 22, the APC circuit 11 controls the laser output emitted from the laser light source of the optical pickup 2 so that the laser output should be the recording output.

At this time, the encoder 13 subjects the recording data Dw from the interface circuit 25 to a predetermined modulation to thereby convert the recording data into binary data to be recorded on the magneto-optical disk D, outputting the binary data as an on/off signal So to the magnetic-field generating circuit 14 at the succeeding stage. Thus, the recording magnetic head 3 produces a magnetic field corresponding to an attribute of the on/off signal So. As a result, the magnetization information corresponding to the recording data Dw are successively recorded on the magneto-optical disk D from the physical address designated by the data recording request.

If on the other hand it is determined in step S25 that the present access request is a data reproduction request, then the processing proceeds to step S29, wherein the access request means 68 outputs the data receiving request command through the output port 46 to the interface circuit 25.

Based on the data receiving request command from the system controller 22, the interface circuit 25 receives the reproduced data Dr successively output from the decoder 17 and then transfers the received reproduced data to the host computer 23 externally connected.

When the processing in step S28 or the processing in step S29 is finished, then the processing proceeds to step S30, wherein the discriminating means 52 discriminates whether or not the interface circuit 25 has finished the data transmission processing or the data receiving processing. The discriminating means 52 carries out the discrimination based on the completion signal input from the interface circuit 25, carrying out this discrimination repeatedly until the completion signal is input therefrom. Specifically, the seek processing means 51 is brought in its standby state for the input of the completion signal.

When the completion signal is input from the interface circuit 25, then processing proceeds to step S31, wherein the optical output setting means 66 outputs a reproduction optical-output setting data Ds through the output port 46 to the APC circuit 11. Based on the reproduction optical-output setting data Ds input from the system controller 22, the APC circuit 11 controls the laser output emitted from the laser light source of the optical pickup 2 so that the laser output should be the reproduction output. Then, the processing proceeds to step S32.

In step S32, the discriminating means 52 discriminates whether or not there is a request to eject the magneto-optical disk D. The discriminating means 52 carries out this discrimination by discriminating whether or not an interruption signal generated based on a key operation by using the key input device 55 is supplied, and further by discriminating, if it is determined that the interruption signal is generated, whether or not the contents of the key input data received by the key input receiving means 56 indicate "ejection of disk".

If it is determined in step S32 that the key input interruption is not supplied from the key input device 55, or if it is determined in step S32 that the key input data is received but the contents thereof do not indicate "ejection of disk", then the processing proceeds to step S7 shown in FIG. 4 and thereafter the processings in step S7 and the succeeding steps are repeatedly carried out. Specifically, if the access request occurs when the seek processing means 51 is kept in its standby state for the data recording request or the data reproduction request input from the interface circuit 25 and the seek operation is required, then the step number calculating means 62 calculates the step number Nsp based on the updated assumed value Tp and so on, and the stepping motor 5 moves the optical pickup 2 based on the calculated step number Nsp.

If it is determined in step S32 that the input key input data indicates "ejection of disk", then the processing proceeds to step S33, wherein the system controller 22 outputs a disk eject request signal through the output port 46 to the servo control circuit 15. Then, the processing proceeds to step S34, wherein, based on the disk eject request signal input from the system controller 22, the servo control circuit 15 servo-controls a drive source of a loading mechanism, not shown, to eject the magneto-optical disk D (precisely the disk cartridge) through a slot to an outside. Then, the processing proceeds to step S35.

In step S35, the discriminating means 52 discriminates whether or not a program end request occurs. The discriminating means 52 carries out this discrimination by discriminating whether or not an end request interruption resulting from a de-energizing operation or the like occurs.

If it is determined in step S35 that the end request does not occur, then the processing returns to step S3 and then the seek processing means 51 is kept in its standby state for the loading of the next magneto-optical disk D. If on the other hand it is determined that the end request occurs, then the seek processing program 51 is ended.

As described above, according to the optical disk apparatus of this embodiment, when the optical pickup 2 is moved along the radius direction of the magneto-optical disk D upon the occurrence of the seek operation request and when the distance by which the optical pickup 2 is to be moved is converted into the step number Nsp, the assumed value of the track pitch Tp is corrected based on an error obtained after the optical pickup 2 is moved (i.e., the difference trk_def between the target track number and the current track number). Therefore, this correction processing allows the assumed value of the track pitch Tp to become approximate to the actual value thereof. Even if initially the target track number is considerably different from the track number of the track where the optical pickup 2 is located after its movement, then the several correction processings makes the assumed value of the track pitch Tp approximate to the actual value thereof and in the succeeding seek operation, the target track number is substantially agreed with the track number of the track where the optical pickup 2 is located after its movement.

As a result, even if the assumed value of the track pitch Tp is different from the actual value thereof, it is possible to position the optical pickup 2 at the target position at high speed, which leads to realization of high-speed access.

If the assumed value of the track pitch Tp is changed simply in response to the above difference, then when the a temporal disturbance instantaneously disturbs the normal seek operation, the error resulting therefrom directly influences the processing for correcting the assumed value of the track pitch Tp and consequently it takes an extra time to make the assumed value thereof approximate to the actual value thereof. However, according to this embodiment, since the direction in which the optical pickup is moved is corrected based on analysis of the difference between the assumed value of the track pitch Tp and the actual value thereof, it is possible to prevent the temporal disturbance from directly influencing the correction processing and to hence correct the assumed value to a proper value in a short period of time.

Since the assumed value of the track pitch Tp is corrected only when the optical pickup 2 is moved to a certain extent and the number trk_def of remaining tracks is large (see the discrimination processings in steps S101 and S102 carried out by the assumed value correction means 65), the assumed value of the track pitch Tp is prevented from being corrected erroneously.

Since an algorithm used in the seek processing program 51 is simple, the number of steps (processings) therefor can be reduced. As a result, an amount of programs to be registered in the program ROM 41 is reduced, which can reduce the programming steps.

While in this embodiment a value of 0.03 μm is employed as the update value Td used in the processing of correcting the assumed value, it is practically proper to select the update value Td within the range from 0.02 μm to 0.05 μm.

While in this embodiment the track pitch Tp is corrected in the assumed value correction processing, other than such correction, correction of only a forward screw pitch or correction of both of the pitches may be employed in the processing.

While in this embodiment the present invention is applied to the optical disk apparatus designed for the magneto-optical disk D, the present invention can be applied to an optical disk apparatus designed for a write-once optical disk using a phase-change type recording material and an optical disk apparatus designed for a read-only optical disk (e.g., a CD, CD-ROM or the like) and also to a magnetic disk apparatus for magnetically recording and reproducing data.

As described above, according to the present invention, the drive-means control apparatus includes the movement-amount calculating means for calculating the movement amount obtained when the object to be moved is moved relative to the object to the target position on the object on the basis of the assumed value set in consideration of the physical attribute of the object, the drive means for moving the object to be moved based on the movement amount obtained by the movement-amount calculating means, the guide means for guiding the object to be moved in the direction toward the target position, the error detecting means for detecting the error between the assumed value and the actual value of the physical attribute based on the position which the object to be moved has reached after its movement and on the target position to output the error information, and the assumed value correcting means for correcting the assumed value based on the error information. Therefore, even if the assumed value of the physical attribute and the actual value thereof are different from each other, it is possible to position the object to be moved to the target position at high speed.

According to the present invention, the dive-means control method includes the movement-amount calculating step of calculating the movement amount obtained when the object to be moved is moved relative to the object to the certain target position on the object on the basis of the assumed value set in consideration of the physical attribute of the object, the drive step of moving the object to be moved based on the movement amount obtained in the movement-amount calculating step, the guide step of guiding the object to be moved in the direction toward the target position, the error detecting step of detecting the error between the assumed value and the actual value of the physical attribute based on the position which the object to be moved has reached after its movement and on the target position to output the error information, and the assumed value correcting step of correcting the assumed value based on the error information. Therefore, even if the assumed value of the physical attribute and the actual value thereof are different from each other, it is possible to position the object to be moved to the target position at high speed.

According to the present invention, the disk apparatus for accessing the disk with a head includes the rotating means for rotating the disk loaded thereonto, the head guided in the radius direction of the disk for accessing the information data on the disk, the head-movement-amount calculating means for calculating the movement amount obtained when the head is moved to the target position on the disk on the basis of the assumed value set in consideration of the physical attribute of the disk, the head moving means for moving the head based on the movement amount obtained by the head-movement-amount calculating means, the guide means for guiding the head in the direction toward the target position, the error detecting means for detecting the error between the assumed value and the actual value of the physical attribute based on the position which the head has reached after its movement and on the target position to output the error information, and the assumed value correcting means for correcting the assumed value based on the error information. Therefore, even if the assumed value of the physical attribute and the actual value thereof are different from each other, it is possible to position the optical head to the target position at high speed.

Having described a preferred embodiment of the present invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

What is claimed is:

1. A disk apparatus for accessing a disk with a head, comprising:
    a rotating means for rotating a disk loaded thereon;
    a head;
    a head-movement-amount calculating means for calculating a movement amount of said head from a present position of said head to a target position on said disk based on an assumed value set based upon a track pitch that is defined by the type of said disk;
    a head moving means for moving said head from the present position along a direction toward said target position based on the movement amount obtained by said head-movement-amount calculating means;
    an error detecting means for determining that said target position and a position which said head has reached after the drive means movement has been competed are different and outputting corresponding error information;
    an assumed value updating means for providing an updated assumed value by increasing or decreasing the assumed value by a predetermined update value based on different conditions indicated by said error information; and
    means for providing a corrected assumed value by using said updated assumed value.

2. A disk apparatus according to claim 1, wherein said head moving means comprises a stepping motor, and wherein said movement amount comprises a step number of said stepping motor.

3. A disk apparatus according to claim 2, wherein said error detecting means further outputs said error information based on a forward amount per one step of said stepping motor and said track pitch.

4. A disk apparatus according to claim 3, wherein said error detecting means comprises:
    a first dividing means for dividing the forward amount per one step of said stepping motor by said track pitch to output a divided forward amount,
    a distance detecting means for calculating said distance between said target position and said position which said head has reached after its movement, and
    a second dividing means for dividing said distance by said divided forward amount to output a divided distance information, and outputs said divided distance information as said error information.

5. A disk apparatus according to claim 1, wherein said means for providing a corrected assumed value comprises:
    an upper-limit correction value means for providing an upper-limit correction value, and
    a comparing means for comparing the updated assumed value and said upper-limit correction value, and, when the updated assumed value is larger than said upper-limit correction value, providing the upper-limit correction value as said corrected assumed value.

6. A disk apparatus according to claim 1, wherein said means for providing a corrected assumed value comprises:
    a lower-limit correction value means for providing a lower-limit correction value, and
    a comparing means for comparing the updated assumed value and said lower-limit correction value, and, when the updated-assumed value is smaller than said lower-limit correction value, providing the lower-limit correction value as said corrected assumed value.

7. A disk access method of accessing a disk with a head, comprising:
    a rotating step of rotating a disk;
    a head-movement-amount calculating step of calculating a movement amount of a head from a present position of said head to a target position on said disk based on an assumed value set based upon a track pitch that is defined by the type of said disk;
    a head moving step of moving said head from the present position along a direction toward said target position based on the movement amount obtained in said head-movement-amount calculating step;
    an error detecting step of determining that said target position and a position which said head has reached after the drive step movement has been competed are different and outputting corresponding error information;

an assumed value updating step of providing an updated assumed value by increasing or decreasing the assumed value by a predetermined update value based on different conditions indicated by said error information; and a step of providing a corrected assumed value by using said updated assumed value.

8. A disk access method according to claim 7, wherein said head moving step comprises a head moving step of moving said head by a stepping motor, and wherein said movement amount comprises a step number of said stepping motor.

9. A disk access method according to claim 8, wherein said error detecting step outputs said error information further based on a forward amount per one step of said stepping motor and said track pitch.

10. A disk access method according to claim 9, wherein said error detecting step comprises:

a first dividing step of dividing said forward amount of said stepping motor by said track pitch to output a divided forward amount, a distance detecting step of calculating said distance between said target position and said position which said head has reached after its movement, and a second dividing step of dividing said distance by said divided forward amount to output a divided distance information, said divided distance information is output as said error information.

11. A disk access method according to claim 7, wherein said step of providing a corrected assumed value comprises:

a step of providing an upper-limit correction value, and a step of comparing the updated assumed value and said upper-limit correction value, and, when said corrected assumed value is larger than said upper-limit correction value, providing said upper-limit correction value as said corrected assumed value.

12. A disk access method according to claim 7, wherein said step of providing a corrected assumed value comprises:

a step of providing a lower-limit correction value, and a step of comparing the updated assumed value and said lower-limit correction value, and, when said corrected assumed value is smaller than said lower-limit correction value, providing said lower-limit correction value as said corrected assumed value.

* * * * *

UNITED STATES PATENT AND TRADEMARK OFFICE
CERTIFICATE OF CORRECTION

PATENT NO. : 6,442,109 B1
DATED : August 27, 2002
INVENTOR(S) : Michihiko Iida

It is certified that error appears in the above-identified patent and that said Letters Patent is hereby corrected as shown below:

<u>Column 2,</u>
Line 31, change "an" to -- a --.

<u>Column 6,</u>
Line 4, delete "-" between "The" and "recording";
Line 21, delete "em";
Line 49, delete "-".

<u>Column 7,</u>
Line 48, change "rotates" to -- rotate --;
Line 53, change "Zones" to -- zones --.

<u>Column 10,</u>
Line 64, insert -- . -- between "R1" and "Then,".

<u>Column 11,</u>
Line 15, delete "of" (second occurrence).

<u>Column 14,</u>
Line 7, change "5201" to -- S201 --.

<u>Column 15,</u>
Line 12, change "tack" to -- track --;
Line 25, change "assume d-value" to -- assumed-value --;
Line 38, change "th e" to -- the --.

<u>Column 18,</u>
Line 6, delete "the" (second occurrence).

<u>Column 20,</u>
Line 65, change "competed" to -- completed --.

UNITED STATES PATENT AND TRADEMARK OFFICE
CERTIFICATE OF CORRECTION

PATENT NO. : 6,442,109 B1
DATED : August 27, 2002
INVENTOR(S) : Michihiko Iida

It is certified that error appears in the above-identified patent and that said Letters Patent is hereby corrected as shown below:

Column 22,
Line 3, insert -- and -- between "information" and "said".

Signed and Sealed this

Sixteenth Day of September, 2003

JAMES E. ROGAN
*Director of the United States Patent and Trademark Office*